United States Patent
Ostwald et al.

(10) Patent No.: US 8,528,952 B2
(45) Date of Patent: *Sep. 10, 2013

(54) GRIPPER ASSEMBLY FOR DATA STORAGE SYSTEM

(75) Inventors: Timothy C. Ostwald, Louisville, CO (US); Daniel J. Plutt, Superior, CO (US)

(73) Assignee: Oracle America, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,815

(22) Filed: Feb. 1, 2012

(65) Prior Publication Data

US 2012/0139277 A1 Jun. 7, 2012

Related U.S. Application Data

(62) Division of application No. 10/819,032, filed on Apr. 6, 2004, now Pat. No. 8,134,799.

(51) Int. Cl.
 *B25J 15/02* (2006.01)
 *B66C 1/42* (2006.01)
 *G11B 15/68* (2006.01)

(52) U.S. Cl.
 USPC .......................................... 294/192; 294/86.4

(58) Field of Classification Search
 USPC .............. 294/192, 86.4, 119.1, 2, 103.1, 116, 294/907; 414/741, 793, 802; 360/92.1, 30.43, 360/92; 369/30.43, 30.44, 30.45
 See application file for complete search history.

(56) References Cited

U.S. PATENT DOCUMENTS

| | | | | |
|---|---|---|---|---|
| 4,132,318 A | * | 1/1979 | Wang et al. ................... | 414/591 |
| 4,675,856 A | | 6/1987 | Rudy et al. | |
| 4,680,523 A | * | 7/1987 | Goumas et al. ............... | 318/685 |
| 4,707,013 A | * | 11/1987 | Vranish et al. ............. | 294/119.1 |
| 4,736,971 A | * | 4/1988 | McManus ..................... | 294/87.1 |
| 4,772,170 A | * | 9/1988 | Oldfield ..................... | 414/792.9 |
| 4,835,634 A | * | 5/1989 | Ostwald ....................... | 360/92.1 |
| 4,864,511 A | | 9/1989 | Moy et al. | |
| 4,984,108 A | * | 1/1991 | Grant et al. .................. | 360/92.1 |
| 5,036,503 A | * | 7/1991 | Tomita ....................... | 369/30.43 |
| 5,184,861 A | * | 2/1993 | Voellmer .................. | 294/119.1 |
| 5,235,474 A | | 8/1993 | Searle | |
| 5,236,296 A | | 8/1993 | Ostwald | |
| 5,242,259 A | | 9/1993 | Yeakley | |
| 5,253,911 A | | 10/1993 | Egan et al. | |
| 5,848,872 A | | 12/1998 | Manes et al. | |
| 5,893,295 A | * | 4/1999 | Bronnert ......................... | 74/488 |
| 6,016,291 A | | 1/2000 | Joos | |
| 6,034,927 A | | 3/2000 | Pollard | |
| 6,064,544 A | | 5/2000 | Wada | |
| 6,094,321 A | | 7/2000 | Pollard | |
| 6,301,218 B1 | | 10/2001 | Jones | |
| 6,454,509 B1 | | 9/2002 | Kappel et al. | |
| 6,826,008 B2 | | 11/2004 | Paulat | |
| 7,002,772 B2 | | 2/2006 | Yardy | |
| 7,212,375 B2 | * | 5/2007 | Dickey et ..................... | 360/96.4 |
| 7,753,638 B2 | * | 7/2010 | Ishiyama ....................... | 414/280 |
| 8,134,799 B1 | * | 3/2012 | Ostwald et al. ............. | 360/92.1 |
| 8,238,053 B2 | * | 8/2012 | Yamakawa .................. | 360/92.1 |

\* cited by examiner

*Primary Examiner* — Paul T Chin
(74) *Attorney, Agent, or Firm* — Brooks Kushman P.C.

(57) ABSTRACT

A gripper assembly for use with a media cartridge includes a gripper support and first and second gripper members supported by the gripper support. The gripper members are moveable asymmetrically with respect to the gripper support for gripping the media cartridge.

19 Claims, 4 Drawing Sheets

GRIPPER ASSEMBLY FOR DATA STORAGE SYSTEM

CROSS-REFERENCE TO RELATED APPLICATIONS

This application is a division of U.S. application Ser. No. 10/819,032 filed Apr. 6, 2004, now U.S. Pat. No. 8,134,799, the disclosure of which is incorporated in its entirety by reference herein.

BACKGROUND OF THE INVENTION

1. Field of the Invention

The invention relates to a gripper assembly for a data storage system.

2. Background Art

A data storage system that houses multiple media cartridges may include a robotic arm for removing a cartridge from a storage slot and for moving the cartridge to another location. Such a robotic arm may include a gripper assembly that is used to grasp the media cartridge. An example of a gripper assembly is disclosed in U.S. Pat. No. 6,016,291.

SUMMARY OF THE INVENTION

Under the invention, a gripper assembly for use with a media cartridge is provided. The gripper assembly includes a gripper support and first and second gripper members supported by the gripper support. The gripper members are moveable asymmetrically with respect to the gripper support for gripping the media cartridge.

A data storage system according to the invention includes a cartridge storage frame for storing multiple media cartridges, and a robotic arm assembly that is moveable with respect to the cartridge storage frame. The robotic arm assembly includes a guide member and a gripper subassembly having a carriage that is moveable along the guide member. The gripper subassembly further including first and second gripper members supported by the carriage. The gripper members are moveable asymmetrically with respect to the carriage for gripping one of the media cartridges.

Further under the invention, a data storage system includes a cartridge storage arrangement for storing multiple media cartridges, and a robotic device that is moveable with respect to the cartridge storage arrangement for selectively gripping first and second media cartridges having different sizes. The robotic device includes a gripper assembly having a gripper support and first and second gripper members supported by the gripper support. The first and second gripper members are moveable with respect to the gripper support for gripping each of the first and second media cartridges. The first gripper member is configured to achieve a predetermined position with respect to the gripper support when gripping each of the first and second media cartridges. The second gripper member is configured to achieve a first closed position when gripping the first media cartridge and a second closed position different than the first closed position when gripping the second media cartridge.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

Figure 1:
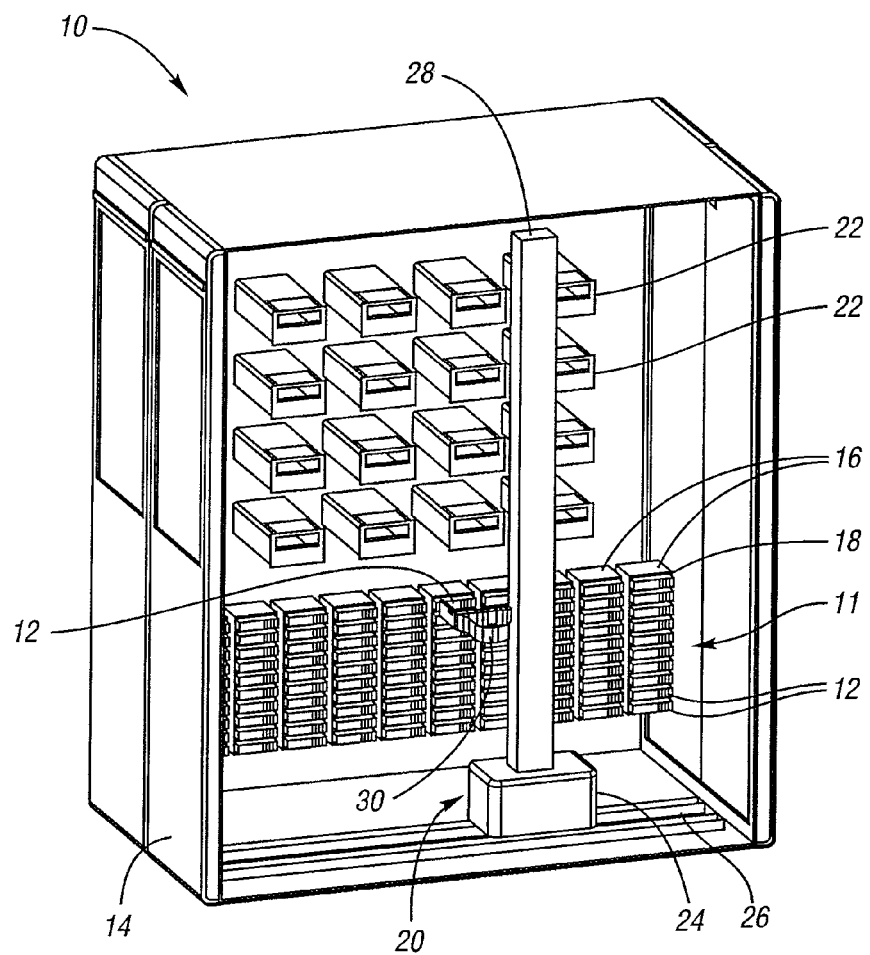
FIG. 1 is a perspective view of a data storage system according to the invention, wherein the system includes multiple media cartridges disposed in multiple slots, and a robotic device for removing the media cartridges from the slots.

FIG. 1 shows a data storage system, such as a library system 10, according to the invention. The system 10 includes a cartridge storage arrangement 11 for storing multiple media cartridges 12, such as tape cartridges and/or disk cartridges. While the storage arrangement 11 may have any suitable configuration, in the embodiment shown in FIG. 1, the storage arrangement 11 includes a housing or frame 14 that supports multiple media cartridge storage magazines 16. Each storage magazine 16 has multiple slots 18 for receiving multiple media cartridges 12. The frame 14 may also support a robotic device, such as robotic arm assembly 20, that is used to remove cartridges 12 from the storage magazines 16, and to position the cartridges 12 within or proximate to media players 22 that are also supported by the frame 14. As explained below in detail, the robotic arm assembly 20 is particularly useful for gripping media cartridges 12 having different sizes.

The robotic arm assembly 20 includes a base 24 that is moveable horizontally along a track 26 of the frame 14, a guide member 28 attached to the base 24, and a picker subassembly 30 that is moveably attached to the guide member 28 such that the picker subassembly 30 is moveable vertically with respect to the guide member 28. Alternatively, the system 10 may be provided with one or more robotic arm assemblies that have any suitable configuration such that at least a portion of each robotic arm assembly is moveable with respect to the frame 14.

Figure 2:
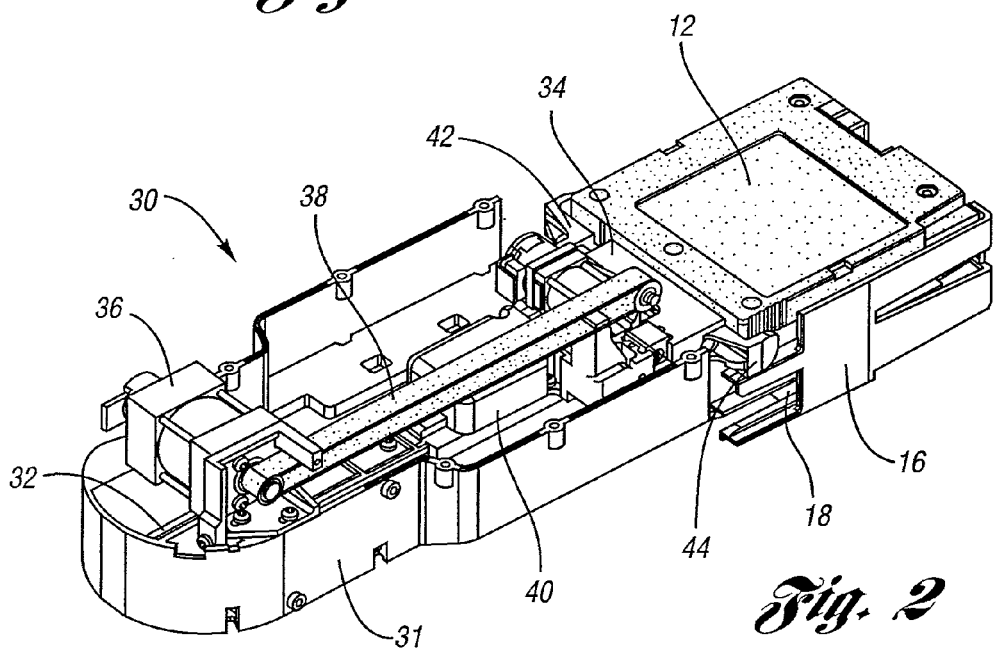
FIG. 2 is a perspective view of a picker assembly of the robotic device, which includes a gripper assembly shown in an extended position.
Figure 3:
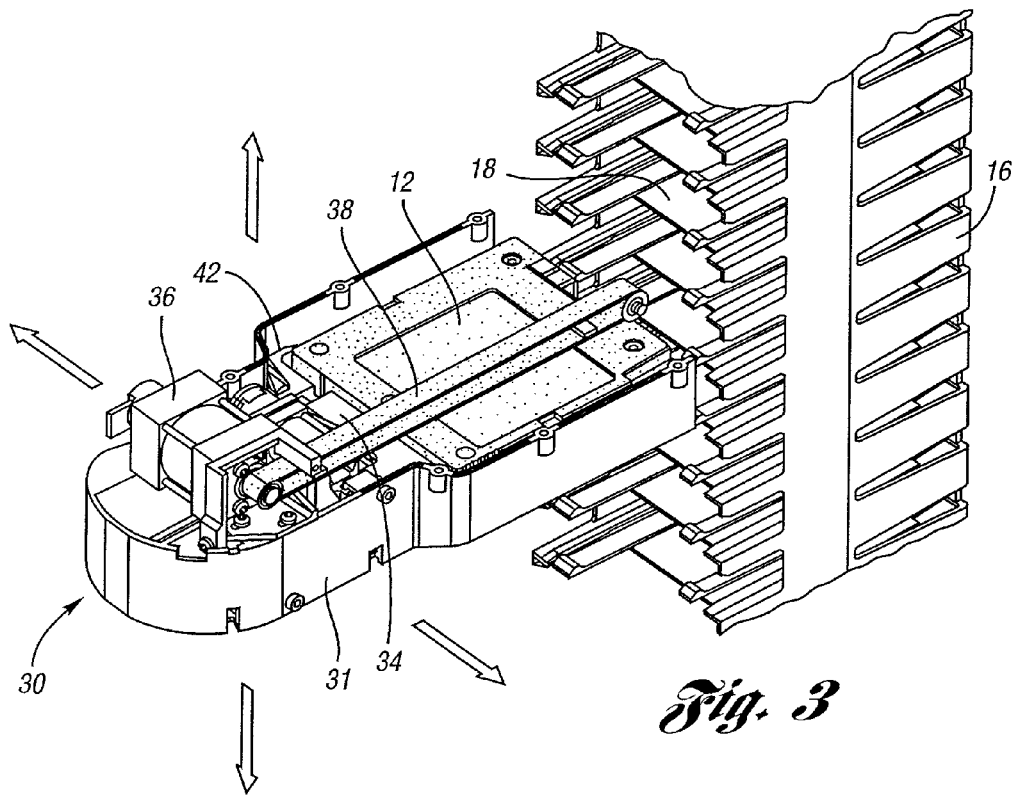
FIG. 3 is a perspective view of the picker assembly and a media cartridge storage magazine, wherein the gripper assembly is shown in a refracted position.

Referring to FIGS. 2 and 3, the picker subassembly 30 includes a housing 31, a guide member such as a rail 32 attached to the housing 31, and a gripper subassembly 34 that is moveable along the rail 32 between an extended position, shown in FIG. 2, and a retracted position, shown in FIG. 3. The picker subassembly 30 also includes a drive assembly, such as a motor 36 and drive belt 38, connected to the gripper subassembly 34 for moving the gripper subassembly 34 between the extended and retracted positions.

The gripper subassembly 34 includes a gripper support, such as a carriage 40, that is moveable along the rail 32, and first and second gripper members, such as first and second gripper fingers 42 and 44, respectively, that are supported by the carriage 40. In the embodiment shown in FIGS. 2-4, the gripper fingers 42 and 44 are moveable asymmetrically with respect to the carriage 40 for gripping a particular media cartridge 12. The gripper fingers 42 and 44 may also be provided with pads 45, such as rubber pads, to facilitate gripping of the media cartridge 12 and to limit wear.

Figure 4:
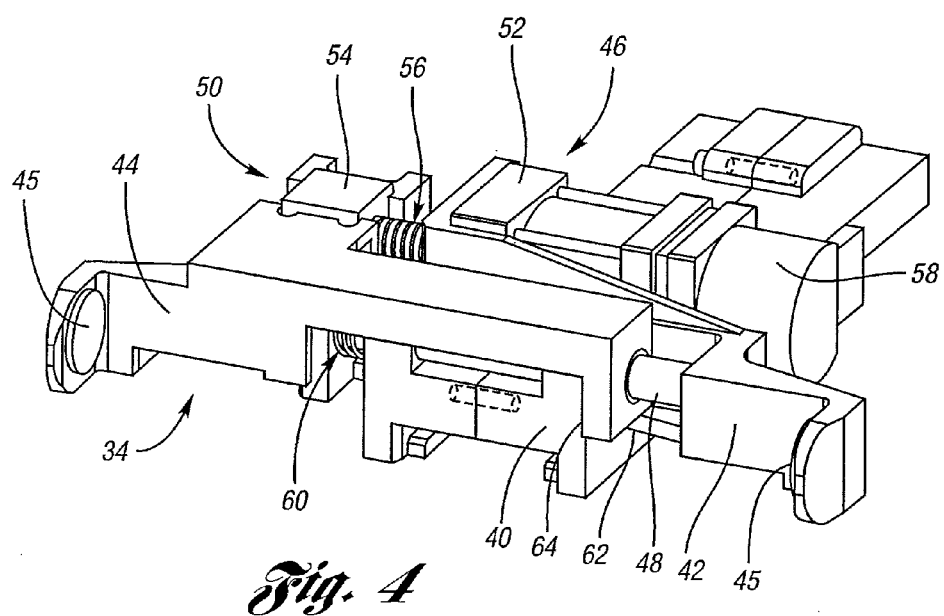
FIG. 4 is a perspective view of the gripper assembly including first and second gripper members.

While the gripper subassembly 34 may have any suitable configuration to enable movement of the gripper fingers 42 and 44, in the embodiment shown in FIG. 4, the gripper subassembly 34 includes an actuator 46 for sliding the gripper fingers 42 and 44 on a shaft 48 fixed to the carriage 40. The actuator 46 includes a lead screw subassembly 50 having a motor 52 mounted on the first gripper finger 42, a lead nut 54 mounted on the second gripper finger 44, and a lead screw 56 extending between the motor 52 and lead nut 54. The actuator 46 may also include a motor position encoder 58, or other suitable device, that cooperates with a controller (not shown) for controlling operation of the motor 52. Upon rotation of the lead screw 56 by the motor 52, the gripper fingers 42 and 44 may be opened and closed for gripping a media cartridge 12, as explained below in detail. Alternatively, the gripper subassembly 34 may be provided with any suitable actuator for moving the gripper fingers 42 and 44.

The gripper subassembly 34 may further include a biasing member, such as a spring 60, for urging the first gripper finger 42 toward a home position shown in FIG. 4. In the embodiment shown in FIG. 4, the first gripper finger 42 includes a home stop 62 that engages the carriage 40 when the first gripper finger 42 is in the home position.

Figure 6:
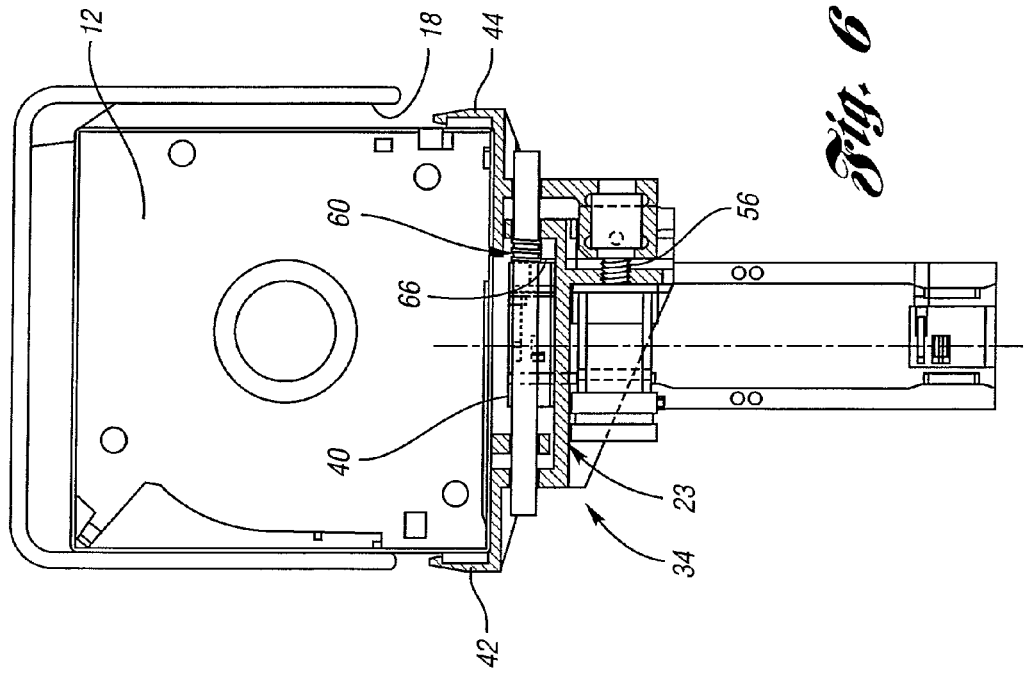
FIG. 6 is a cross-sectional view similar to FIG. 5, showing the gripper members in closed positions.
Figure 5:
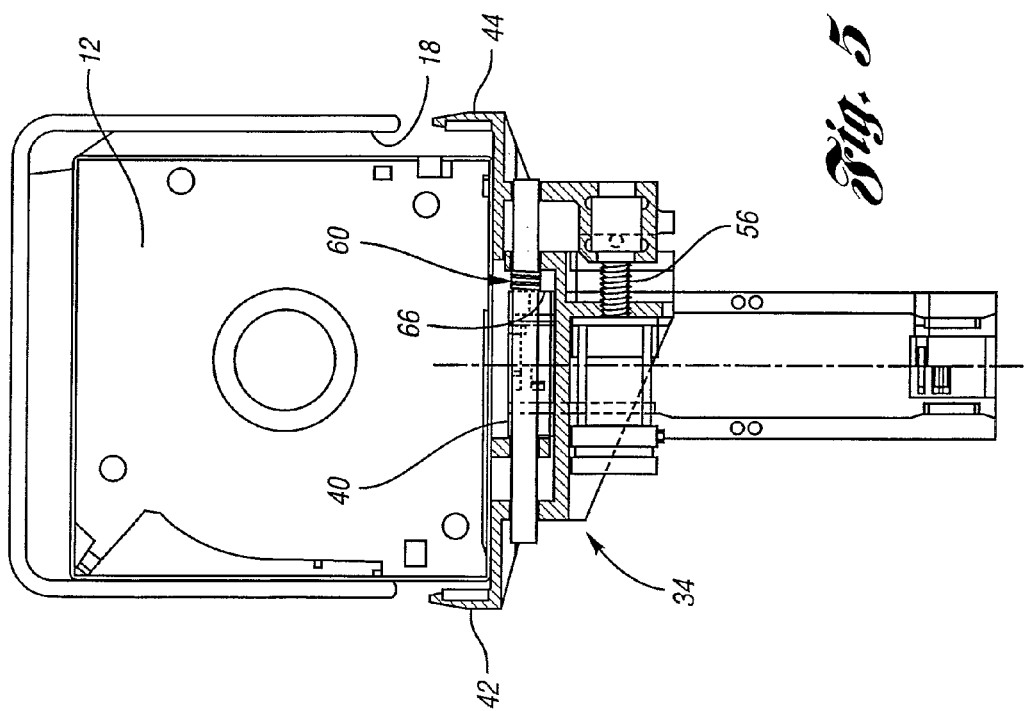
FIG. 5 is a cross-sectional view of the gripper assembly showing the gripper members in open positions.

Referring to FIGS. 4-6, each gripper finger 42 and 44 is moveable between an open position, shown in FIG. 5, and a closed position, shown in FIG. 6, in which each gripper finger 42 and 44 is engaged with a media cartridge 12. During operation, the motor 52 may be used to drive the lead screw 56 in a first direction to open the second gripper finger 44 to its open position. The second gripper finger 44 may also be provided with an open stop 64 that engages the carriage 40 when the second gripper finger 44 is in the open position. Upon full opening of the second gripper finger 44, continued rotation of the lead screw 56 causes the first gripper finger 42 to move toward its open position and away from the second gripper finger 44, thereby compressing the spring 60. The first gripper finger 42 may also be provided with an open stop 66 that engages the carriage 40 when the first gripper finger 42 is in the open position. Alternatively or supplementally, the open position of the first gripper finger 42 may be defined by the encoder 58 and/or controller (not shown).

The gripper subassembly 34 may instead be configured such that the gripper fingers 42 and 44 move in any suitable manner. For example, the gripper subassembly 34 may be configured such that the first gripper finger 42 moves toward its open position prior to the second gripper finger 44 reaching its full open position.

As shown in FIG. 5, the second gripper finger 44 may be provided with a larger range of travel than the first gripper finger 42. For example, the second gripper finger 44 may be configured to travel in the range of 0.5 to 1.3 centimeters (cm), while the first gripper finger 42 may be configured to travel in the range of 0.1 to 0.4 cm. Thus, in the embodiment shown in FIG. 5, the gripper fingers 42 and 44 are moveably asymmetrically with respect to the carriage 40.

When the lead screw 56 is driven in a second direction opposite the first direction, the gripper fingers 42 and 44 move toward their closed positions to grip a media cartridge 12, as shown in FIG. 6. Provided that the media cartridge 12 is properly located in a particular slot 18 and that the gripper subassembly 34 is properly located with respect to the media cartridge 12, the closed position of the first gripper finger 42 will coincide with the home position of the first gripper finger 42. The closed position of the second gripper finger 44 may vary depending on the size, such as the width or height, of the media cartridge 12. Upon full engagement of the gripper fingers 42 and 44 with the media cartridge 12, the motor 52 may be deactivated.

After gripping the media cartridge 12, the gripper subassembly 34 may be retracted so as to remove the media cartridge 12 from the slot 18. Returning to FIG. 1, the robotic arm assembly 20 may then be used to locate the media cartridge 12 proximate a particular media player 22. For example, the picker subassembly 30 may be moved vertically with respect to the guide member 28, and the guide member 28 and base 24 may be moved horizontally with respect to the track 26. Next, the picker subassembly 30 may be used to insert the media cartridge 12 into the media player 22, which may include one or more read and/or write devices for performing read and/or write operations on the media cartridge 12. After desired operations have been performed on the media cartridge 12, the robotic arm assembly 20 may be used to remove the media cartridge 12 from the media player 22 and to reposition the media cartridge in the slot 18. The system 10 may also include one or more controllers (not shown) for controlling operation of the robotic arm assembly 20 and the media players 22.

Advantageously, referring to FIGS. 4-6, the gripper subassembly 34 may be used to grip media cartridges 12 of different sizes, and to orient each media cartridge 12 with respect to a particular reference point on the gripper subassembly 34. More specifically, the gripper subassembly 34 is configured to align each media cartridge 12 with respect to the home position of the first gripper finger 42. The home position may therefore be referred to as a datum position.

Furthermore, during a media cartridge extraction or removal procedure, the gripper subassembly 34 may be oriented in the same relative position with respect to a particular slot 18 regardless of the size of the media cartridge 12 disposed in the slot 18. For example, each slot 18 may be configured to receive different sized media cartridges 12 and to bias each media cartridge 12 toward one side (datum side) of the slot 18 using a biasing member, such as a spring or wedge, and/or gravity. With such a configuration, rather than orienting the gripper assembly 34 with respect to the centerline of the media cartridge 12, the gripper subassembly 34 may be oriented such that the home position of the first gripper finger 42 is generally aligned with the datum side of the slot 18, regardless of the size of the media cartridge 12 disposed in the slot 18. The gripper fingers 42 and 44 may then be moved to grip the media cartridge 12 such that the first gripper finger 42 achieves the home position, and the second gripper finger 44 achieves a variable closed position depending on the size of the media cartridge 12.

With such generic positioning of the gripper subassembly 34, repeatability and accuracy may be improved. As a result, wear on slots 18 and media cartridges 12 may be reduced. Furthermore, control software for the system 10 may be simplified, as the one or more controllers (not shown) do not need to determine the size of the media cartridges 12 disposed in the slots 18.

With the configuration described above, both gripper fingers 42 and 44 are also able to float with respect to the carriage 40. As a result, even if a particular media cartridge 12 is improperly positioned in a respective slot 18, the gripper subassembly 34 may align the media cartridge 12 with respect to the home position of the first gripper finger 42 upon extraction of the media cartridge 12 from the slot 18. For example, if the first gripper finger 42 is not in the home position upon extraction of the media cartridge 12 from the slot 18, the spring 60 will urge both gripper fingers 42 and 44 to move simultaneously in the same direction until the first gripper finger 42 reaches the home position. Thus, propagation of errors is reduced or eliminated when repositioning the media cartridge 12 in the slot 18 or at a different location.

The ability of the gripper fingers 42 and 44 to float with respect to the carriage 40 also enables the gripper subassembly 34 to compensate for abnormal loads that may be encountered during media cartridge extraction and placement operations. For example, a horizontal force acting on one or both gripper fingers 42 and 44 may cause the gripper fingers 42 and 44 to move with respect to the carriage 40 and compress the spring 60.

Figure 7:
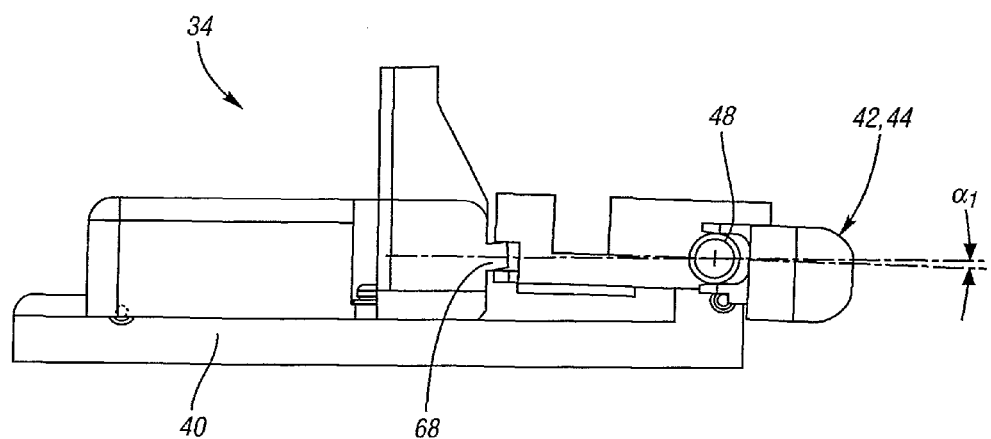
FIG. 7 is a side view of the gripper assembly showing the gripper members rotated downward.
Figure 8:
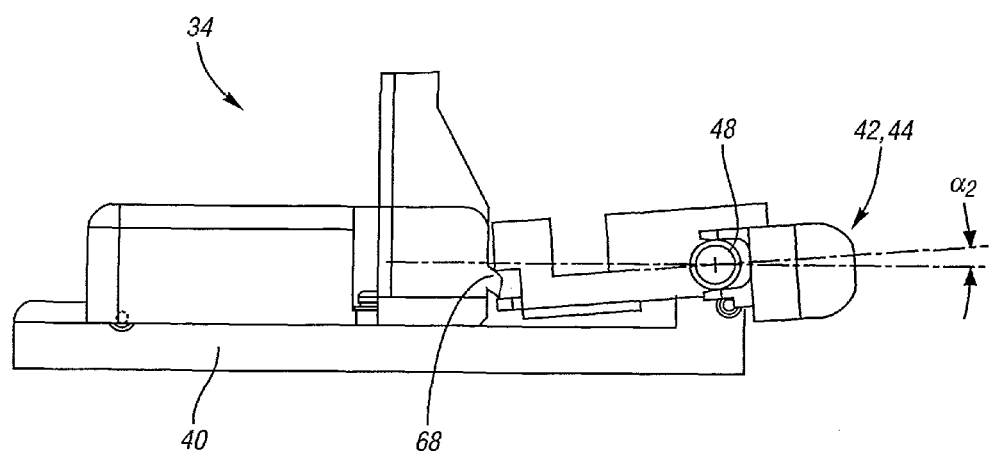
FIG. 8 is a side view of the gripper assembly showing the gripper members rotated upward.

Referring to FIGS. 7 and 8, the gripper subassembly 34 may also be configured such that the gripper fingers 42 and 44 are rotatable about the shaft 48. The gripper fingers 42 and 44 may be held in a generally flat position, or other normal use position, by a compliant member 68, such as a flexible projection or spring that is attached to the carriage 40. The compliant member 68 is configured to flex or otherwise move to allow rotation of the gripper fingers 42 and 44, such as downward rotation and/or upward rotation through angles α1 and/or α2. As a result, the gripper subassembly 34 is able to compensate for abnormal forces that may be encountered if the gripper subassembly 34 is positioned too high or too low, for example, with respect to a particular slot 18 and/or media cartridge 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, while the gripper fingers 42 and 44 shown in the Figures are configured to grip left and right sides of a particular media cartridge 12, the gripper fingers 42 and 44 may be configured to grip top and bottom surfaces of the media cartridge 12.

What is claimed is:

1. A gripper assembly for use with a data storage system having a cartridge storage arrangement and a media cartridge, the gripper assembly comprising:
    a gripper support; and
    first and second gripper members supported by the gripper support, the gripper members being moveable generally linearly and asymmetrically with respect to the gripper support for gripping the media cartridge when the media cartridge is received in the cartridge storage arrangement of the data storage system.

2. The gripper assembly of claim 1 further comprising an actuator that is configured to move the second gripper member to an open position while the first gripper member remains in a closed position.

3. The gripper assembly of claim 2 further comprising a spring member for biasing the first gripper member toward the closed position.

4. The gripper assembly of claim 2 wherein the actuator is configured to move the first gripper member away from the second gripper member after the second gripper member is moved to the open position.

5. The gripper assembly of claim 4 wherein the actuator comprises a lead screw subassembly associated with the second gripper member.

6. The gripper assembly of claim 1 wherein the first gripper member is moveable over a first range of travel, and the second gripper member is moveable over a second range of travel greater than the first range of travel.

7. The gripper assembly of claim 1 wherein the gripper members are rotatable with respect to the gripper support.

8. The gripper assembly of claim 7 further comprising a compliant member for holding the gripper members in a desired angular orientation with respect to the gripper support, the compliant member being configured to allow rotation of the gripper members with respect to the gripper support.

9. The gripper assembly of claim 1 wherein the gripper members are both moveable with respect to the gripper support in a first direction while gripping the media cartridge, to thereby allow the media cartridge to move laterally with respect to the gripper support.

10. The gripper assembly of claim 1 further comprising an actuator that moves the gripper members asymmetrically with respect to the gripper support for gripping the media cartridge, wherein the first gripper member is moveable over a first range of travel, and the second gripper member is moveable over a second range of travel greater than the first range of travel, and wherein the actuator comprises a motor attached to one of the gripper members, a driven member attached to the other gripper member, and a rotatable driving member that extends between the motor and the driven member.

11. A gripper assembly for use with a data storage system having a cartridge storage arrangement for storing a media cartridge, the gripper assembly comprising:
    a gripper support;
    first and second gripper members supported by the gripper support, the gripper members being moveable asymmetrically with respect to the gripper support for gripping the media cartridge when the media cartridge is received in the cartridge storage arrangement of the data storage system;
    a shaft associated with the gripper members; and
    an actuator that is configured to move the gripper members along the shaft such that the first gripper member is moveable over a first range of travel, and the second gripper member is moveable over a second range of travel greater than the first range of travel.

12. A gripper assembly for use with a data storage system having a cartridge storage arrangement that is configured to store multiple media cartridges including first and second media cartridges having different sizes, the gripper assembly comprising:
    a gripper support;
    first and second gripper members supported by the gripper support; and
    a shaft associated with the gripper members;
    wherein the first and second gripper members are moveable with respect to the gripper support and along the shaft for gripping each of the first and second media cartridges when each respective media cartridge is received in the cartridge storage arrangement of the data storage system, and wherein the first gripper member is configured to achieve a predetermined position with respect to the gripper support when gripping each of the first and second media cartridges, and the second gripper member is configured to achieve a first closed position when gripping the first media cartridge and a second closed position different than the first closed position when gripping the second media cartridge.

13. The gripper assembly of claim 12 further comprising a spring member for biasing the first gripper member toward the predetermined position.

14. The gripper assembly of claim 12 further comprising an actuator that is configured to move the second gripper member toward an open position, and is further configured to move the first gripper member away from the second gripper member after the second gripper member is moved to the open position.

15. The gripper assembly of 14 wherein the actuator comprises a leadscrew subassembly associated with the second gripper member.

16. The gripper assembly of claim 12 wherein the first gripper member is moveable over a first range of travel, and the second gripper member is moveable over a second range of travel greater than the first range of travel.

17. The gripper assembly of claim 12 wherein the gripper members are rotatable with respect to the gripper support.

18. The gripper assembly of claim 17 further comprising a compliant member for holding the gripper members in a desired angular orientation with respect to the gripper support, the compliant member being configured to allow rotation of the gripper members with respect to the gripper support.

19. The gripper assembly of claim 12 wherein the gripper members are both moveable with respect to the gripper support in a first direction while gripping one of the media cartridges, to thereby allow the one media cartridge to move laterally with respect to the gripper support.

\* \* \* \* \*